(12) United States Patent
Kong

(10) Patent No.: US 7,613,842 B2
(45) Date of Patent: Nov. 3, 2009

(54) MODULAR, ATTACHABLE OBJECTS WITH TAGS AS INTUITIVE PHYSICAL INTERFACE FACILITATING USER INTERACTION WITH A COMPUTER

(75) Inventor: Yuan Kong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 275 days.

(21) Appl. No.: 10/778,157

(22) Filed: Feb. 17, 2004

(65) Prior Publication Data

US 2005/0182857 A1  Aug. 18, 2005

(51) Int. Cl.
*G06F 3/00* (2006.01)
(52) U.S. Cl. .............................. 710/8; 710/13; 345/172
(58) Field of Classification Search ...................... 710/8, 710/12–14; 345/172
See application file for complete search history.

(56) References Cited

U.S. PATENT DOCUMENTS

| | | | | |
|---|---|---|---|---|
| 6,012,103 | A  * | 1/2000 | Sartore et al. ................... | 710/8 |
| 6,643,715 | B1 * | 11/2003 | Arthur ........................... | 710/14 |
| 6,836,843 | B2 * | 12/2004 | Seroussi et al. ............. | 713/173 |
| 6,848,014 | B2 * | 1/2005 | Landron et al. ............. | 710/303 |
| 6,871,239 | B2 * | 3/2005 | Tanaka ........................... | 710/8 |
| 6,877,091 | B2 * | 4/2005 | Nomizo et al. ................. | 713/2 |
| 6,992,656 | B2 * | 1/2006 | Hughes ....................... | 345/163 |
| 2003/0092493 | A1 * | 5/2003 | Shimizu et al. ............... | 463/43 |

OTHER PUBLICATIONS

2450MHz Long Range Backscatter RFID tag by Alien® Technology Corporation of Morgan Hill, California (2 pages), date unknown but printed from website prior to filing of present application.
Rekimoto, Jun, Ullmer, Brygg, and Oba, Haruo, "DataTiles: A Modular Platform for Mixed Physical and Graphical Interactions,", CHI 2001 (Mar. 3-Apr. 15 ), pp. 269 to 276.
Want, Roy, "RFID: A Key to Automating Everything,", Scientific American, Jan. 2004, pp. 56-65.

* cited by examiner

*Primary Examiner*—Alford W Kindred
*Assistant Examiner*—Chun-Kuan Lee
(74) *Attorney, Agent, or Firm*—Birch, Stewart, Kolasch & Birch, LLP

(57) ABSTRACT

A method, system, and device for adding modular tags, that can be associated with particular configurations, that can be attached to and/or read by a computer peripheral device and/or computer is described. A modular tag reader in a computer peripheral device and/or computer recognizes a modular tag and its associated software configuration, thereby directly initiating user intended actions without the user interacting with the software interfaces. A user can attach modular tags that are intuitively recognizable as performing a particular function, such as a color change, font size change, font style change, highlight operation, and application program initiation. Such modular tags are interpreted by a processor within the host computer and/or within the computer peripheral device to change a configuration in accordance with the tag.

21 Claims, 11 Drawing Sheets

MODULAR, ATTACHABLE OBJECTS WITH TAGS AS INTUITIVE PHYSICAL INTERFACE FACILITATING USER INTERACTION WITH A COMPUTER

FIELD OF THE INVENTION

Aspects of the present invention are directed generally to objects and devices for interacting with a computer. More particularly, aspects of the present invention are directed to preprogrammed and/or programmable tags for defining an application and/or function to aspects of a computer peripheral device such as a computer mouse.

BACKGROUND OF THE INVENTION

Easy to use, intuitive computer user interface has been one factor for the wide spread use of computers in our daily life. In addition to software interface technology, hardware interface components have played a role in the development of the use of computers and the computing environment. For example, many of the successes that can be attributed to a graphics based user interface are equally attributable to hardware elements, such as a computer mouse.

With the explosion of new and various information available to computer users and the increasing frequency of and dependence on computing devices, as well as the varied ways information is managed and accessed, the limited number and often simple button controls present in many computer input devices such as a mouse are not sufficient for all applications. In many situations, due to the lack of user configurable hardware interfaces, users must be familiar with the varying software components and capabilities. Similarly, users are required to perform a number of operations before choosing desired functions, making the experience frustrating, unproductive, and prone to error. Having to interact with the many "bars" present in software interfaces (e.g., tool bar, task pane, etc.) today intimidates many potential computer users.

Further, even when a user configures a peripheral device, such as a mouse, to operate in a certain manner, such as being configured for a left-handed user, a different user, such as a right-handed user, has to reconfigure the mouse through software and/or hardware interfaces. A user cannot easily configure a computer peripheral device to have it operate in a certain manner. A peripheral device cannot be easily configured to operate in a manner designated by a particular user. Still further, a peripheral device cannot be configured to change settings, operations, or functions easily in response to a single user action.

SUMMARY OF THE INVENTION

There is therefore a need for a method and system for adding physically representative tags that can be associated with particular software functions that can be attached to and/or read by a computer peripheral device such as a mouse. One aspect of the invention allows a computer to recognize a modular tag and its associated software functions, thereby directly initiating user intended actions without the user interacting with the software interfaces. According to one aspect of the invention, a user can attach modular tags that are intuitively recognizable as performing a particular function, such as a color change, font size change, font style change, highlight operation, and application program initiation. Such modular objects are interpreted by a processor within the host computer and/or within the computer peripheral device to change an operation/function/setting/parameter in accordance with the tag.

Another aspect of the invention allows a user to immediately configure a computer and/or a computer peripheral device associated with the computer to operate, perform, and/or function in a manner desired by the user without the user having to interact with software interfaces. Still another aspect of the invention allows a user to program a modular tag to define certain operations/settings/functions/parameters for use in defining a configuration of a computer peripheral device.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

In the following description of various illustrative embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
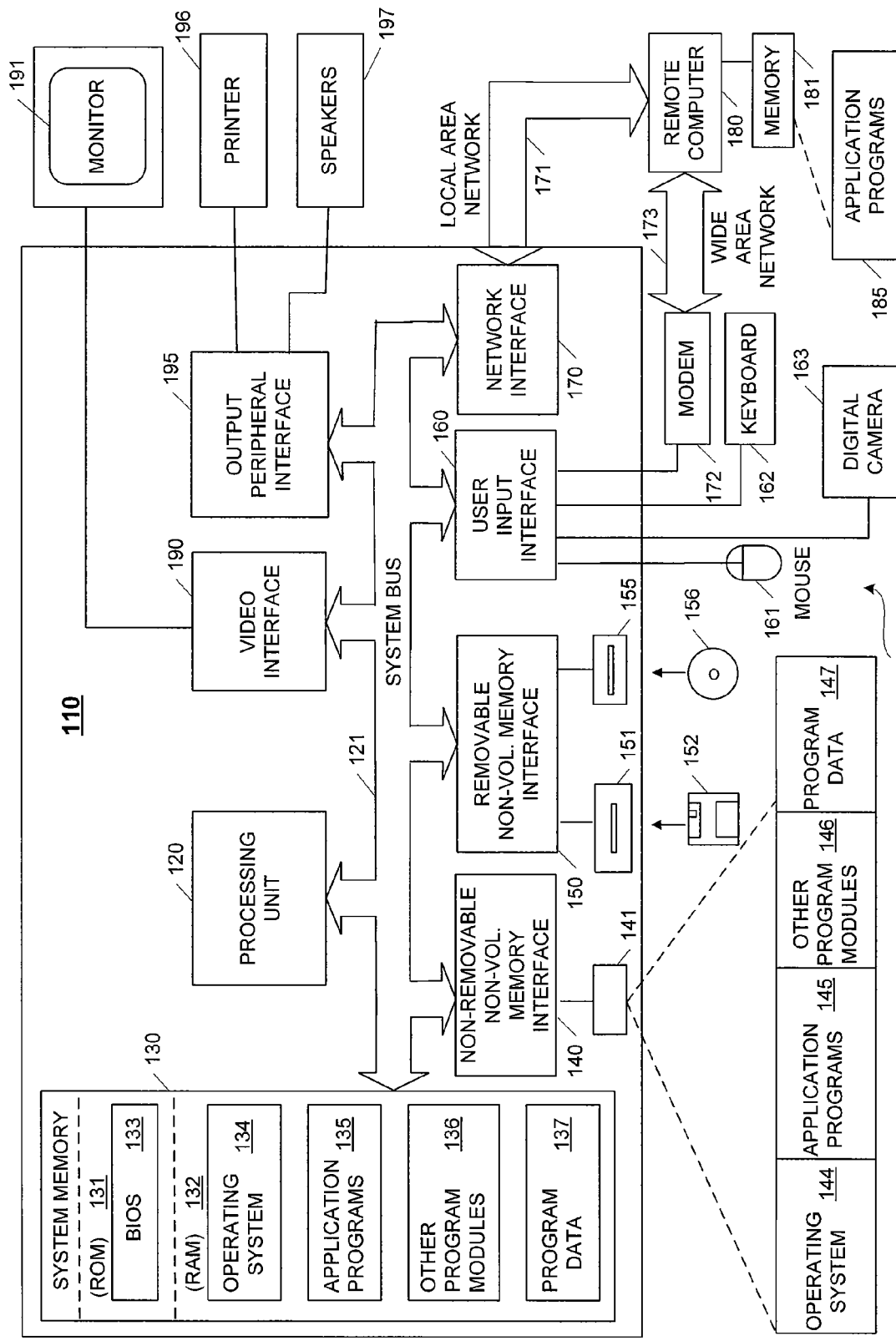
FIG. 1 illustrates a schematic diagram of a general-purpose digital computing environment in which certain aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency or requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
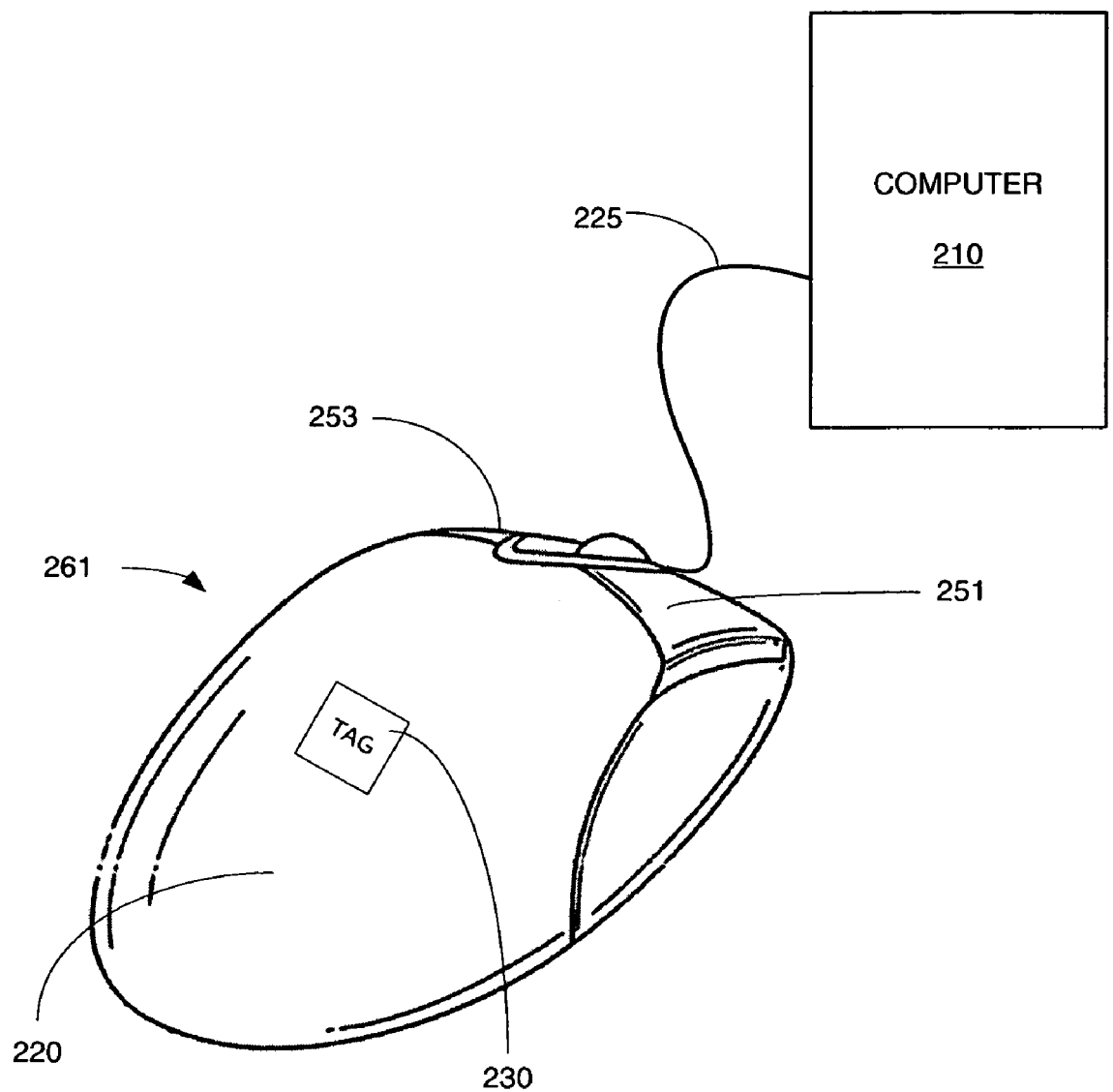
FIG. 2 is a rear perspective view of an electronic mouse type computer input device and computer in accordance with at least one aspect of the present invention.

FIG. 2 is a rear perspective view of an electronic mouse type computer input device 261 and computer 210. Electronic mouse type computer input device 261 includes a housing 220. The bottom of the housing 220 is a substantially flat surface that is arranged to rest on a supporting surface such as a desk or tabletop, but could also simply be held by a user. The upper portion of the housing 220 is shaped to comfortably interface with and support a human hand. In use, electronic mouse type computer input device 261 is connected to a computer 210 and provides signals to the computer 210 to control a cursor or other screen image. Electronic mouse type computer input device 261 and computer 210 may be the pointing device 161 and computer 110 shown in FIG. 1. As is known in the art, a computer input device may also contain one or more actuatable buttons 251 and 253 and/or other mechanisms for receiving user input and converting the same to signals for transmission to the computer 210. Electronic mouse type computer input device 261 may communicate with and receive power from the computer 210 via a wired connection 225, or may be wireless and receive power from a battery within computer input device (not shown). Further, electronic mouse type computer input device 261 also includes a rotor tracking ball or optical signal for tracking of the position of the input device.

As shown in FIG. 2, electronic mouse type computer input device 261 includes an attached modular tag 230. Modular tag 230 is a representative physical object that can be uniquely and/or specifically identified when attached to and/or interacted with a computer peripheral device and/or a computer. Modular tag 230 can be a type of computer readable medium that contains instructions to interface with software applications and automatically modify any or all interactive and aspects of the computer peripheral device and/or computer.

Although not shown in FIG. 2, electronic mouse type computer input device 261 may include an access port, connection point, and/or interaction area within the housing that the modular tag 230 can interact with in some manner. There are a variety of fashions in which a modular tag 230 can interact with the electronic mouse type computer input device 230. For example, modular tag 230 could be a smart tag, also called a radio frequency identification (RFID) tag. RFID tags may include intelligent bar codes that can interact with a computer based system to identify a particular function, operation, parameter, setting, and /or other information/data. As used herein, a configuration includes a function, an operation, a setting, a parameter, and/or other information/data. RFID technology is one method for automatic collection of product, place, time, and/or sensor data without the need for human interaction. A passive RFID tag receives a low-power radio signal via an antenna to power an integrated circuit. Using the energy received from the radio signal, the passive RFID tag can interact with a reader for verification and the exchange of data. Once the reader receives the data, the data can be sent through to a computer for processing and management. An active RFID tag is powered from a source separate to the low-power radio signal and must be activated in some manner. Using the power from the separate source and when activated, the active RFID tag can interact with a reader for verification and the exchange of data.

There are at least two mechanisms for RFID tags that have read and write capabilities, inductively coupled RFID tags and capacitively coupled RFID tags. RFID tags with read and write capability can be changed, updated, and stored. An inductively coupled RFID tag generally includes three elements, a microprocessor, a metal coil, and encapsulating material. The metal coil acts as an antenna for the tag, transmitting signals to a reader. The encapsulating material may be glass or a polymer material that wraps around the microprocessor and metal coil. Inductively coupled RFID tags are powered by the magnetic field that is generated by the reader. The RFID can modulate the magnetic field in order to retrieve and transmit data back to the reader. Inductively coupled RFID tags can be battery powered. A capacitively coupled RFID tag generally includes three elements as well, a microprocessor, a conductive carbon ink, and a paper substrate. The conductive carbon ink performs the same function as a metal coil, to act as the tag's antenna. The conductive carbon ink can be applied to the paper substrate through conventional printing means. The microprocessor can be attached to the printed carbon ink electrodes on the paper substrate, creating a low cost, disposable tag. One example of an RFID tag is the BiStatix® RFID tag manufactured by Motorola, Inc.® of Schaumburg, Ill.

Modular tag 230 may be similar to the RFID tags described above or a thin, flexible plastic medium that includes an electronic memory that has been preprogrammed and/or can be programmed to store instructions for a computer peripheral device and/or computer to operate in a certain manner. Alternatively, modular tag 230 may be a rigid plastic based medium, similar to memory stick technology, which includes the electronic memory. For another example, modular tag 230 may be a conventional barcode that, when read by a computer peripheral device and/or computer, provides data to operate the computer peripheral device and/or computer in a particular manner.

Figure 3A:
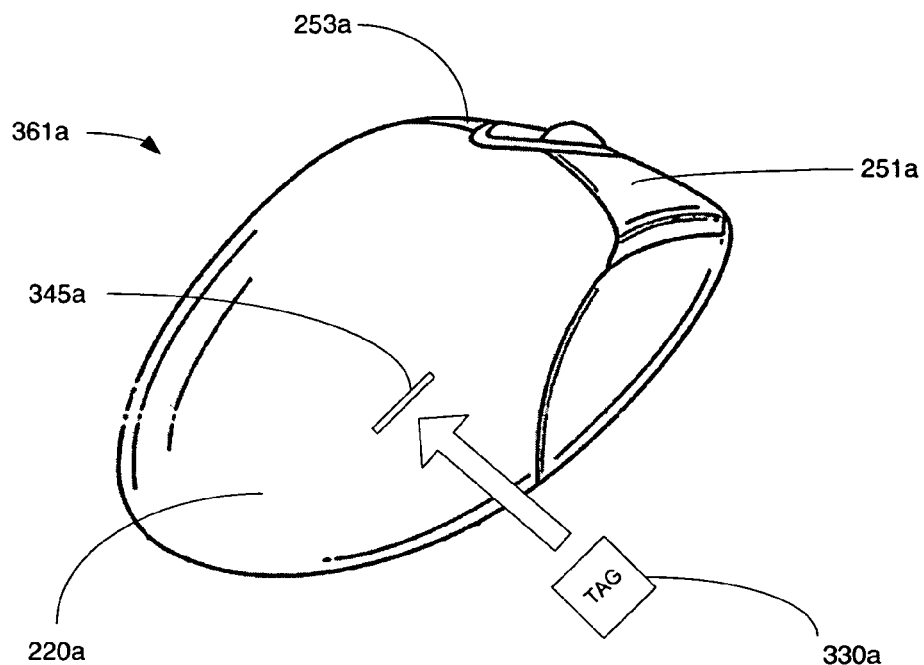
FIGS. 3A and 3B are a rear perspective view of electronic mouse type computer input devices in accordance with at least one aspect of the present invention.
Figure 3B:
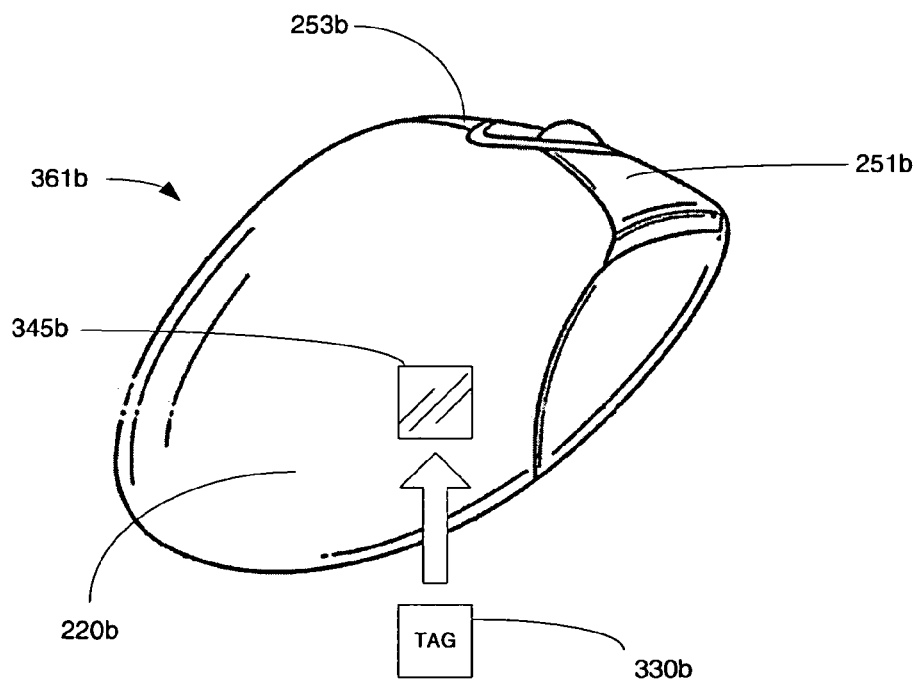

Referring to FIG. 3A, an illustrative embodiment of an electronic mouse type computer input device 361a for interacting with a modular tag 330a in accordance with at least one aspect of the present invention is shown. Electronic mouse type computer input device 361a includes an access port 345a into the housing 220a. Access port 345a allows a modular tag 330a to be inserted into the electronic mouse type computer input device 361a to interact with the input device 361a and/or a computer (not shown). Modular tag 330a may be inserted through the access port 345a to remain within the housing 220a of the electronic mouse type computer input device 361a or may be inserted and removed from, i.e., swiped through, the electronic mouse type computer input device 361a. In either manner, the modular tag 330a is scanned, read, and/or interacted with by the electronic mouse type computer input device 361a and/or computer (not shown) to enable the electronic mouse type computer input device 361a to operate in a particular manner. Referring now to FIG. 3B, another illustrative embodiment of an electronic mouse type computer input device 361b for interacting with a modular tag 330b in accordance with at least one aspect of the present invention is shown. Electronic mouse type computer input device 361b includes an access port 345b on the surface of the housing 220b. Access port 345b allows modular tag 330b to be attached to and/or processed by the electronic mouse type computer input device 361b and/or computer (not shown). In accordance with one embodiment, a user can attach the modular tag 330b to the access port 345b to program the electronic mouse type computer input device to operate in a particular manner. For example, modular tag 330b may include instructions to inform a software application to associate depression of actuatable button 251b with a particular function, such as to turn highlight mode on, to change the color of a font, to change to an underlining mode, to change to an italics mode, to change to a bold mode, to open a particular software program, to perform a reboot of a computer operation, or to increase the output volume of a speaker attached to the computer. Further, modular tag 330b may include instructions to inform a software application to associate depression of actuatable button 251b with a particular application, such as to choose a particular wall paper pattern on a display screen, or to change the overall theme of the computer user interface elements on the display screen. With a modular tag 330b attached to and/or scanned by the electronic mouse type computer input device 361b, when a user depresses actuatable button 251b, the specific operation, parameter, setting, or function will be performed, e.g., the font will change color, a new application program will open, the output volume of the speaker will increase, change the wall paper pattern, or change the theme. Although not shown in FIG. 3A and FIG. 3B, the scroll wheel, common to many electronic mouse type computer input devices, can be configured to output a different variable or have a different variable associated with the output when a modular tag interfaces with the electronic mouse type computer input device.

Figure 4A:
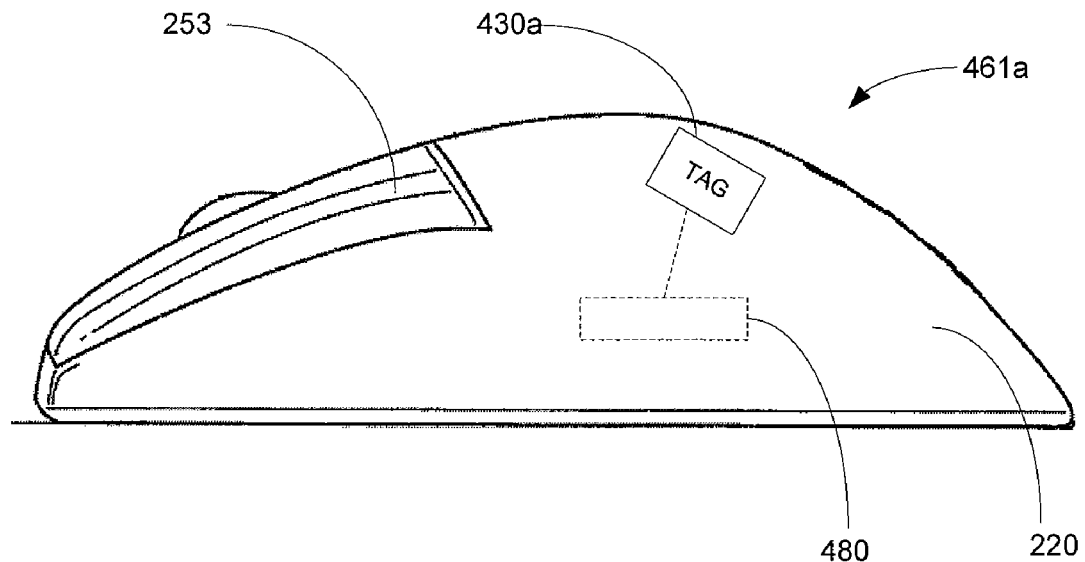
FIGS. 4A and 4B are schematic partial side sectional views of an electronic mouse type computer input device in accordance with at least one aspect of the present invention.
Figure 4B:
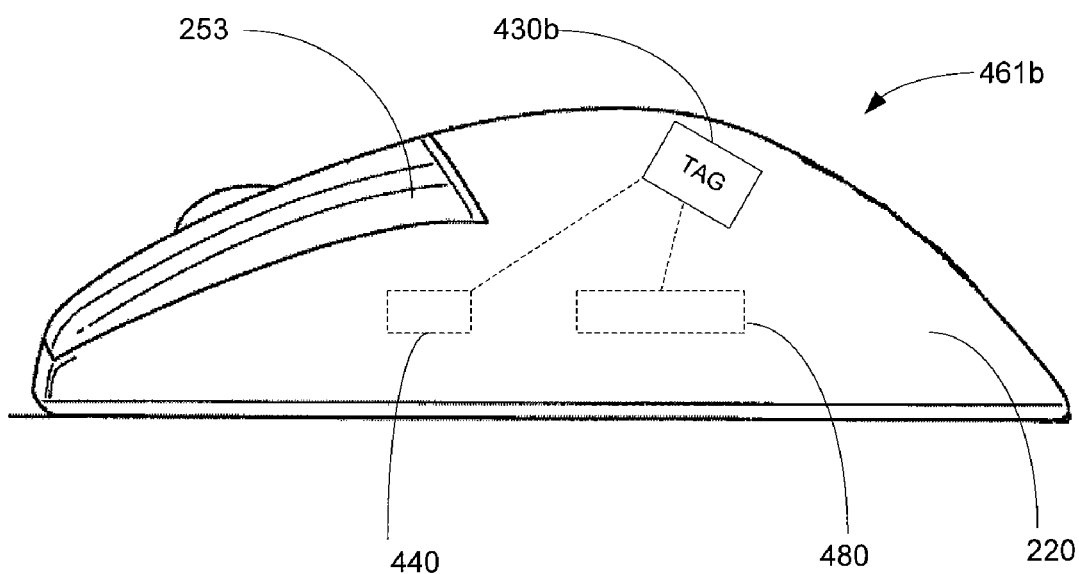

FIGS. 4A and 4B are schematic partial side sectional views of an electronic mouse type computer input device in accordance with at least one aspect of the present invention. In FIG. 4A, electronic mouse type computer input device 461a is shown. Electronic mouse type computer input device 461a is shown to include a housing 220 and actuatable button 253. Attached to electronic mouse type computer input device 461a is a modular tag 430a. As shown in FIG. 4A, modular tag 430a is known as a passive type modular tag. A passive type modular tag 430a operates within close proximity to a modular tag reader 480 and is not connected to a power supply. An example of a passive type modular tag 430a includes a conventional barcode. Modular tag reader 480 recognizes the modular tag 430a and interfaces with software, whether internal to the electronic mouse type computer input device 461a and/or external, such as in a computer (not shown), to initiate and/or associate a desired operation, function, parameter, setting and/or other information/data represented by the modular tag 430a. The dotted line of the reader 480 indicates that the reader is within the housing 220. Electronic mouse type computer input device 461a will perform typical and/or default functions when no such modular tags 430a are attached and/or used. Further, if the modular tag 430a is not recognized by the reader 480, cannot operate the desired function (such as initiating an application program that the associated computer does not have installed), and/or is not authorized for use by the user, the electronic mouse type computer input device 461a can operate in a typical default manner.

FIG. 4B illustrates an example of an electronic type computer input device 461b interacting with an active type modular tag 430b. An active type modular tag 430b is activated only when attached to the electronic mouse type computer input device 461b and when power has been supplied to it. As shown in FIG. 4B, power supply 440 is connected to the active modular tag 430b. The dotted lines indicating the power supply 440 and the reader 480 indicate that the power supply 440 and reader 480 reside within the housing 220. Such an active modular tag 430b may include electrical contacts that, when connected to electrical contacts of power supply 440 within the electronic mouse type computer input device 461b, supply power to the active modular tag 430b. Once powered, the modular tag 430b can be read by the reader 480 to provide instructions to the electronic mouse type computer input device and/or computer (not shown) to operate a computer peripheral device and/or computer to operate in a particular manner. Electronic mouse type computer input device 461b will perform typical and/or default functions when no such modular tags 430b are attached and/or used. Further, if the modular tag 430b is not recognized by the reader 480, cannot operate the desired function (such as initiating an application program that the associated computer does not have installed), and/or is not authorized for use by the user, the electronic mouse type computer input device 461b can operate in a typical default manner.

Active modular tags can include sensors for additional useful interactions. For example, an active modular tag can include a temperature sensor, a touch pad sensor, a biomedical identification sensor, and/or a pressure sensor. An example of a temperature sensor RFID is the 2450MHz Long Range Backscatter RFID tag by Alien® Technology Corporation of Morgan Hill, Calif. These types of active modular tags provide additional information for processing by a processing unit, such as processing unit 120 shown in FIG. 1. As such, for different applications, this information may be utilized to interact with a user and/or perform some associated action in response. For example, for a gaming application program, a pressure sensor can be utilized to detect how hard an actuatable button is being depressed. Such information from the pressure sensor can be used by the gaming application program to increase the speed in which a weapon is discharged in a fighting type game or to slow down a bat swing speed in a baseball type game.

Figure 5:
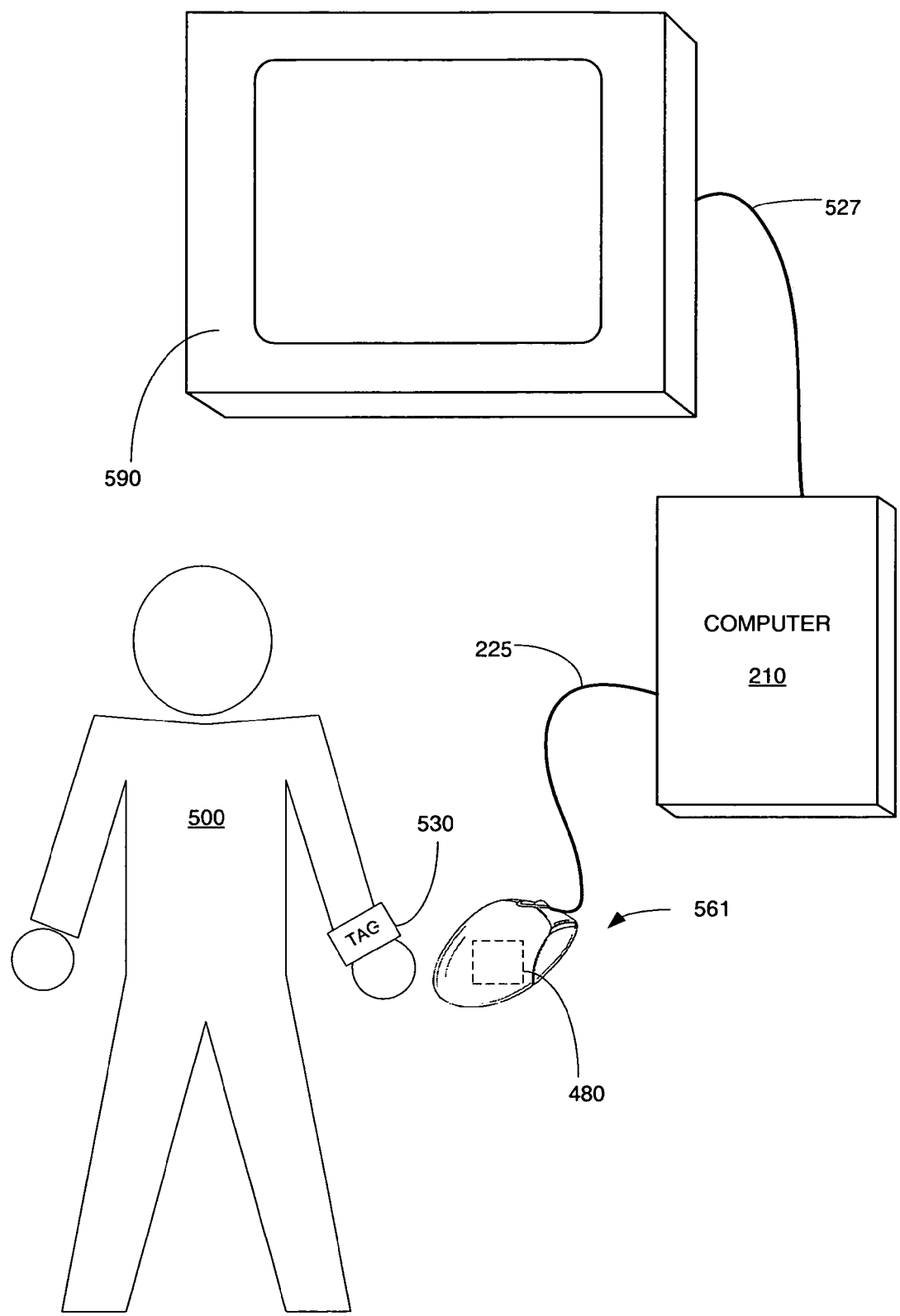
FIG. 5 is an illustrative example of a passive modular tag interacting with a reader in accordance with at least one aspect of the present invention.

FIG. 5 is an illustrative example of a passive modular tag 530 interacting with a reader 480 in accordance with at least one aspect of the present invention. The dotted line representing the reader 480 shows that the reader is physically within the housing of the electronic mouse type computer input device 561. Electronic mouse type computer input device 561 is connected to a computer 210 via connection 225. A display device 590 is shown connected to computer 210 via connection 527. Passive modular tag 530 is shown as a wristband on the arm of user 500. At a certain point when user 500 approaches the electronic mouse type computer input device 561, reader 480 can read the modular tag 530 and automatically interact with software, whether within the electronic mouse type computer input device 561 and/or the computer 210, to program the actuatable buttons on the electronic mouse type computer input device 561 to be configured in a certain manner. Additionally or alternatively, the reader can interact with software to define certain configurations for the display device 590, such as the contrast setting and/or brightness setting, which are associated with the modular tag 530. Further, the modular tag may include instructions for configuration of the computer 210. For example, the reader 480 may read instructions in the modular tag 530 that define a certain type of wall paper design/pattern that is preferred by the user 500 for display on the display device 590, a certain appearance scheme for colors and graphics, and/or certain icons for display. Although shown as being contained within a wristband, modular tag 530 may be attached to a keychain, an article of clothing, a card within a wallet or purse, and/or in any number of different mediums.

Figure 6:
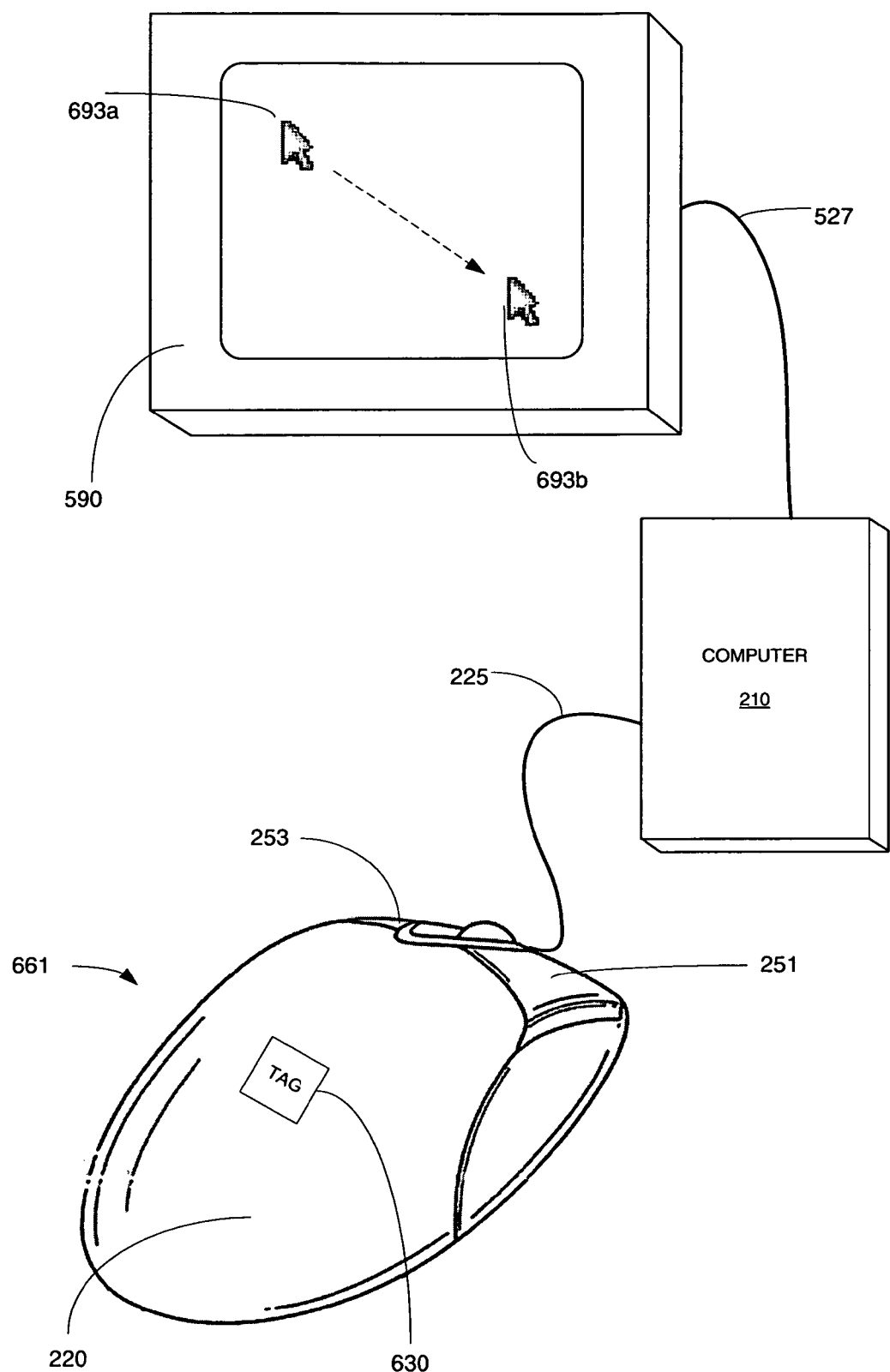
FIG. 6 is a rear perspective view of an electronic mouse type computer input device, computer, and electronic computer display device in accordance with at least one aspect of the present invention.

FIG. 6 is a schematic diagram of an illustrative embodiment of an electronic mouse type computer input device 661 interacting with a computer 210 in accordance with at least one aspect of the present invention. The electronic mouse type computer input device 661 is shown connected to computer 210 via connection 225. A display device 590 is shown connected to computer 210 via connection 527. In this example, modular tag 630 is programmed to store instructions that associate a depression of actuatable button 251 with an instruction to move a cursor position to the lower right hand corner of a display screen. For example, if a user has positioned cursor to a position 693a in the upper left hand corner of the display screen of the display device 590, upon depression of actuatable button 251, the cursor automatically moves to position 693b in the lower right hand corner of the display screen of the display device 590. In such an example, modular tag 630 includes the necessary instructions to inform computer 210 to implement the desired function upon depression of actuatable button 551. A user has not moved the electronic mouse type computer input device 661 and yet has moved the position of the cursor on the display screen of the display device 590.

Figure 7A:
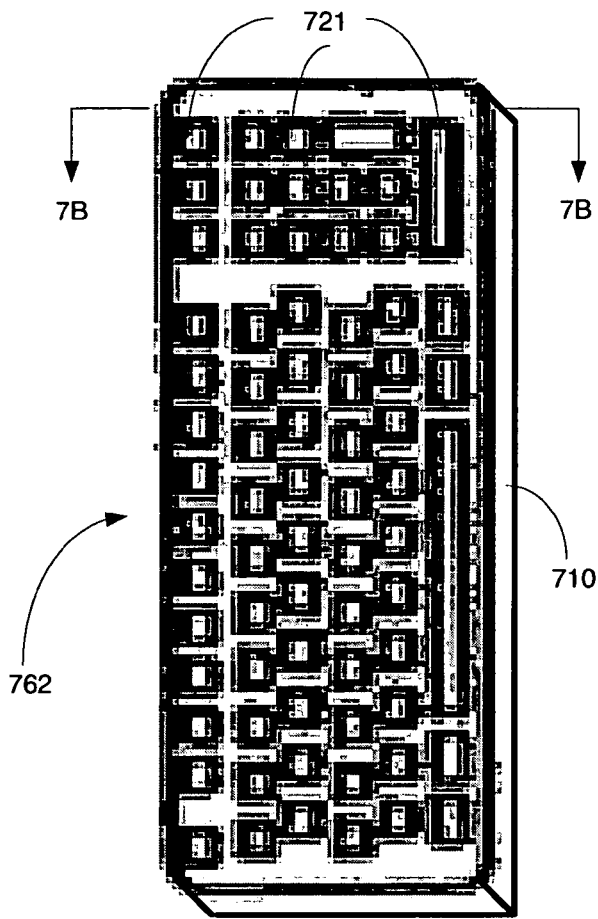
FIG. 7A is a front perspective view of a keyboard in accordance with at least one aspect of the present invention.
Figure 7B:
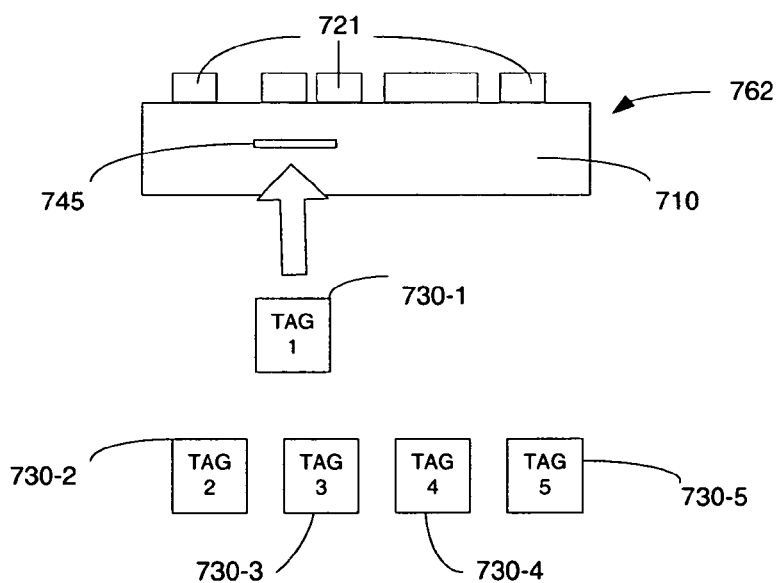
FIG. 7B is a side view of the keyboard of FIG. 7A and a grouping of tags that may be used with the keyboard.

FIGS. 7A and 7B illustrate a keyboard type of computer input device 762 in accordance with at least one aspect of the present invention. In FIG. 7A, a keyboard device 762 is shown with an outer housing 710 and actuatable buttons/keys 721. The keyboard device 762 could be keyboard device 162 as shown in FIG. 1 with some or all of the additional features described in this aspect of the present invention. The keyboard device 762 shown in FIG. 7B is a side view of the keyboard device shown in FIG. 7A. As shown, keyboard device 762 in FIG. 7B includes actuatable buttons/keys 721 and outer housing 710. The keyboard device 762 also includes an access port 745 to allow a modular tag 730-1 to be inserted therein. Modular tag 730-1, identified as TAG 1, may be preprogrammed to have instructions that allow keyboard 762 to operate in a certain manner. For example, a user may desire to have certain actuatable buttons/keys 721 to perform specified operations. Modular tags 730-1 to 730-5 contain data that allows keyboard 762 to operate in certain defined manners. Modular tag 730-1 may have instructions that cause a certain actuatable button/key 721, such as the "F1" actuatable button/key to represent a new function. Modular tag 730-1 may include instructions to program the F1 actuatable button/key to change a color of the font to red. Additional instructions within the modular tag 730-1 may program a different actuatable button/key, such as the "F2" actuatable button/key to change a size of a font to 10 pt. Modular tags 730-2 to 730-5 may include other instructions for allowing a keyboard device 762 to operate in a certain manner. Although shown as an insertion into the housing 710 of the keyboard device 762, it should be understood that the modular tag 730-1 may be attached in other manners and/or may be scanned and/or read by the keyboard 762 and not physically attached in any manner.

Still further modular tags 730-1 to 730-5 may include instructions for operation with certain application programs. For example, modular tag 730-1 may include instructions to program the F1 actuatable button to change a color of the font to red when operating in a word processing based application program. Additionally, if a user is operating in a different application program, such as a spreadsheet based application program, modular tag 730-1 may include instructions to program the F1 actuatable button to change a size of the font to 10 pt.

Modular tags can change the pointing cursor into a different shape, color, size, and/or function for different software applications. When using a pointing device in a 10-feet or presentation scenario, a user may not be able to precisely control the navigation as she would be able to on a desktop. A particular modular tag may actuate proper menu functions without the need for navigation, e.g., copy and paste operations. Modular tags can change a set of functions keys into application-specific functions, e.g., define F-keys differently in different application programs. Additionally, modular tags can configure operations for connections to the Internet different than for gaming application programs. Still further, modular tags can also be associated with different users so that different configurations can be initiated and/or recovered for that particular user. Modular tags also can be utilized to operate with a number of different types of computer peripheral devices and/or computers. As such, modular tags can include application program specific instructions, device specific functions, and/or user specific functions.

Figure 8A:
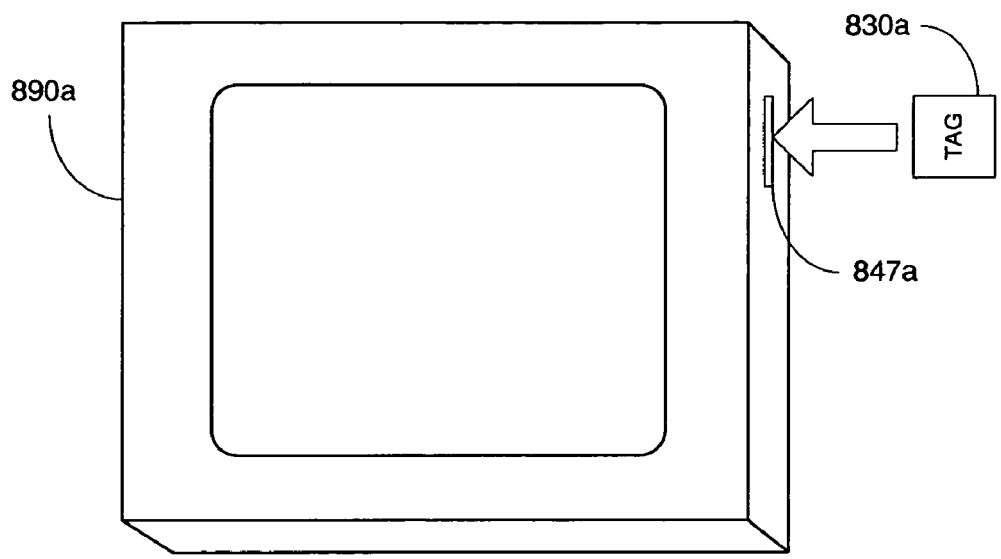
FIGS. 8A and 8B are a front perspective view of electronic display devices in accordance with at least one aspect of the present invention.
Figure 8B:
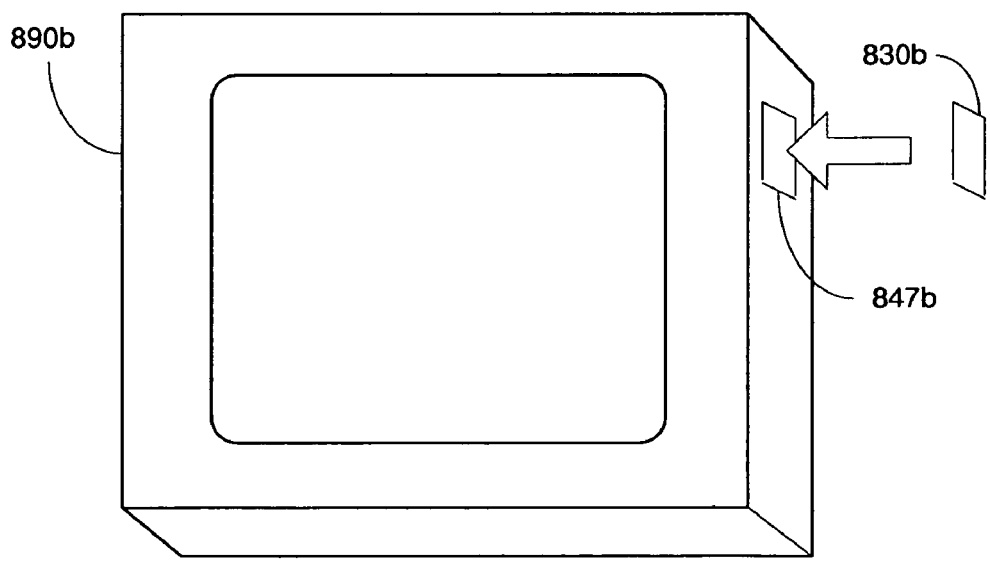

Referring now to FIGS. 8A and 8B, illustrative embodiments of electronic display devices 890a and 890b are shown. In FIG. 8A, electronic display device 890a is shown with an access port 847a. The access port 847a of the electronic display device 890a allows a modular tag 830a to be inserted into the electronic display device 890a. In FIG. 8B, electronic display device 890b includes an access port 847b. Access port 847b of the electronic display device 890b allows a modular tag 830b to be attached to and/or scanned by/read by electronic display device 890b.

Figure 9:
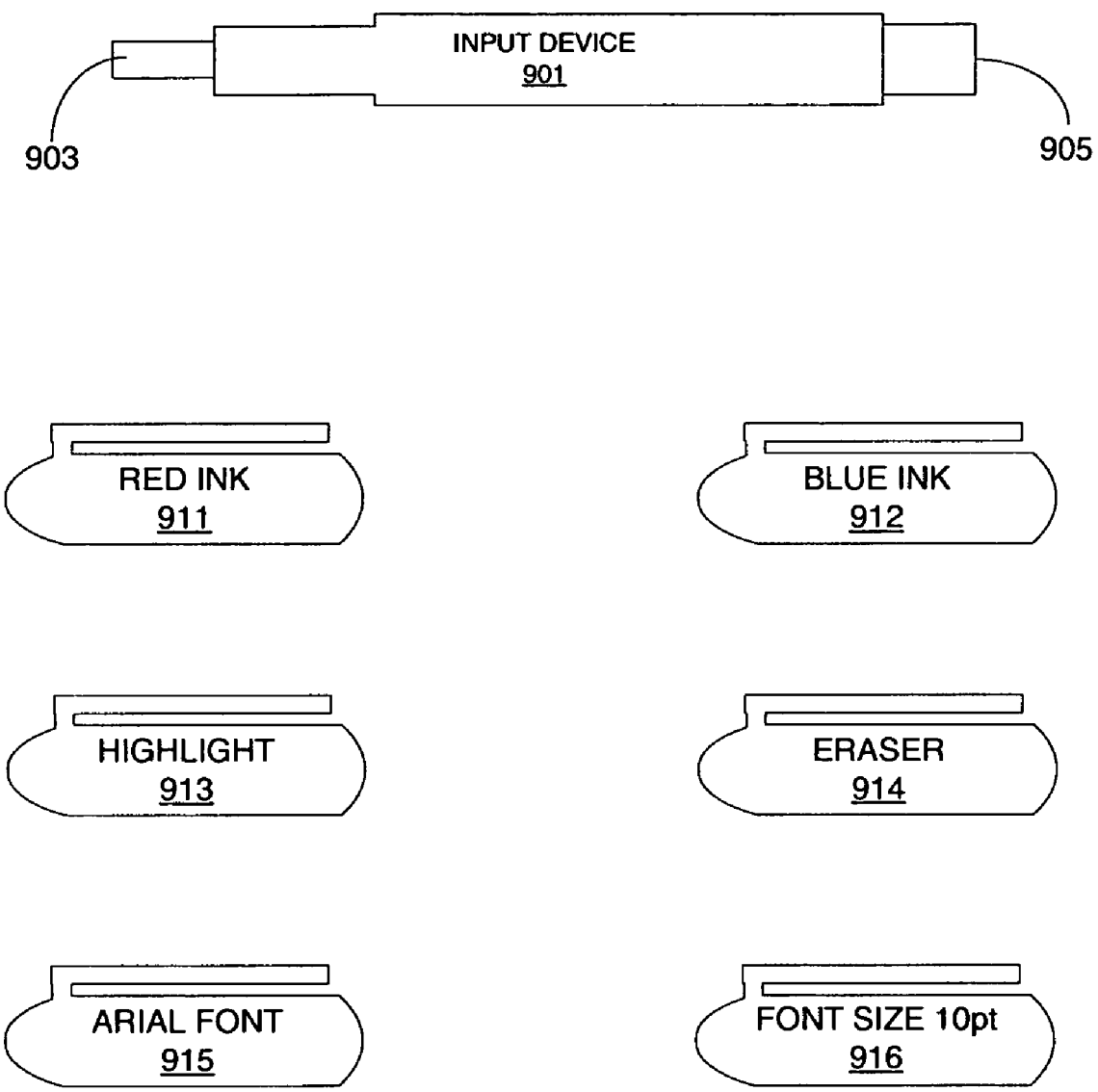
FIG. 9 is a pen type computer input device and an assortment of tags that may be utilized with the pen type computer input device.

FIG. 9 is an illustrative example of a pen type computer input device 901 and an assortment of modular tags 911-916 that may be utilized with the pen type computer input device 901. Pen type computer input device 901 includes a pen tip 903 that can be used against a surface for inputting freehand movements by a user. Such a pen type computer input device 901 may be utilized by a Tablet PC by Microsoft® Corporation of Redmond, Wash. Pen type computer input device 901 also includes an end 905. End 905 may include a reader, such as reader 480, for reading a modular tag attached to the pen type computer input device 901. FIG. 9 also shows a number of modular tags 911-916. Modular tags 911-916 are shaped as caps for a pen. In this example, a user can attach one of the modular tags, such as modular tag 911, to the end 905 of the pen type computer input device 901 to provide instructions that the pen type computer input device will now write in red digital ink. Alternatively and/or at any time, a user can change to a different modular tag, such as modular tag 913, to perform a different function, such as to write in highlighted digital ink. The examples shown in FIG. 9 for the different types of modular tags are but a few examples. Any number of different types of information may be stored within a modular tag and the present invention is not so limited to the examples shown. Although not shown, the pen tip 903 may include the reader for reading a modular tag and/or may have a cap attached to the pen tip 903.

Figure 10:
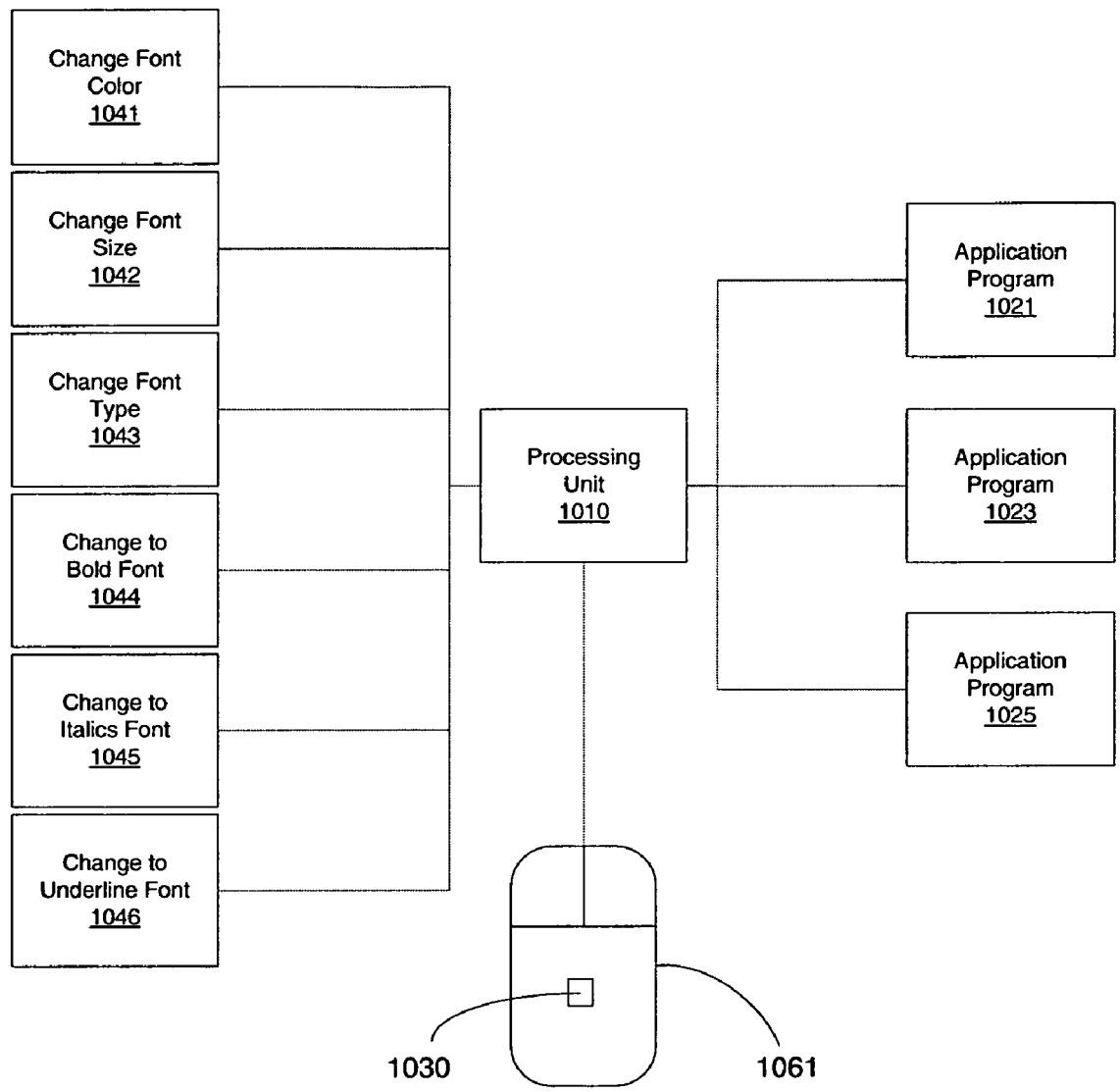
FIG. 10 shows a schematic diagram depicting a relationship between various computer application programs and a computer input device for controlling an actuatable button on the computer input device.

FIG. 10 shows a schematic diagram depicting a relationship between various computer application programs 1021-1025 and an electronic mouse type computer input device 1061 for controlling an actuatable button on the computer input device 1061. As shown, electronic mouse type computer input device 1061 is connected to a processing unit 1010. Processing unit 1010 may be the processing unit 110 shown in FIG. 1, a different processing unit external to the electronic mouse type computer input device 1061, and/or a processing unit within the electronic mouse type computer input device 1061. In the arrangement shown in FIG. 10, processing unit 1010 may be coupled to various application programs 1021, 1023 and 1025 and to various operations 1041-1046 to associate an actuatable button on the electronic mouse type computer input device 1061 with a particular operation and/or a particular application program. Processing unit 1010 can take the information/data within the modular tag 1030 and configure the actuatable button of the electronic mouse type computer input device 1061 to operate in a particular manner, such as to change font type 1043 when operating within application program 1021 if the actuatable button on the electronic mouse type computer input device 1061 is depressed.

Figure 11:
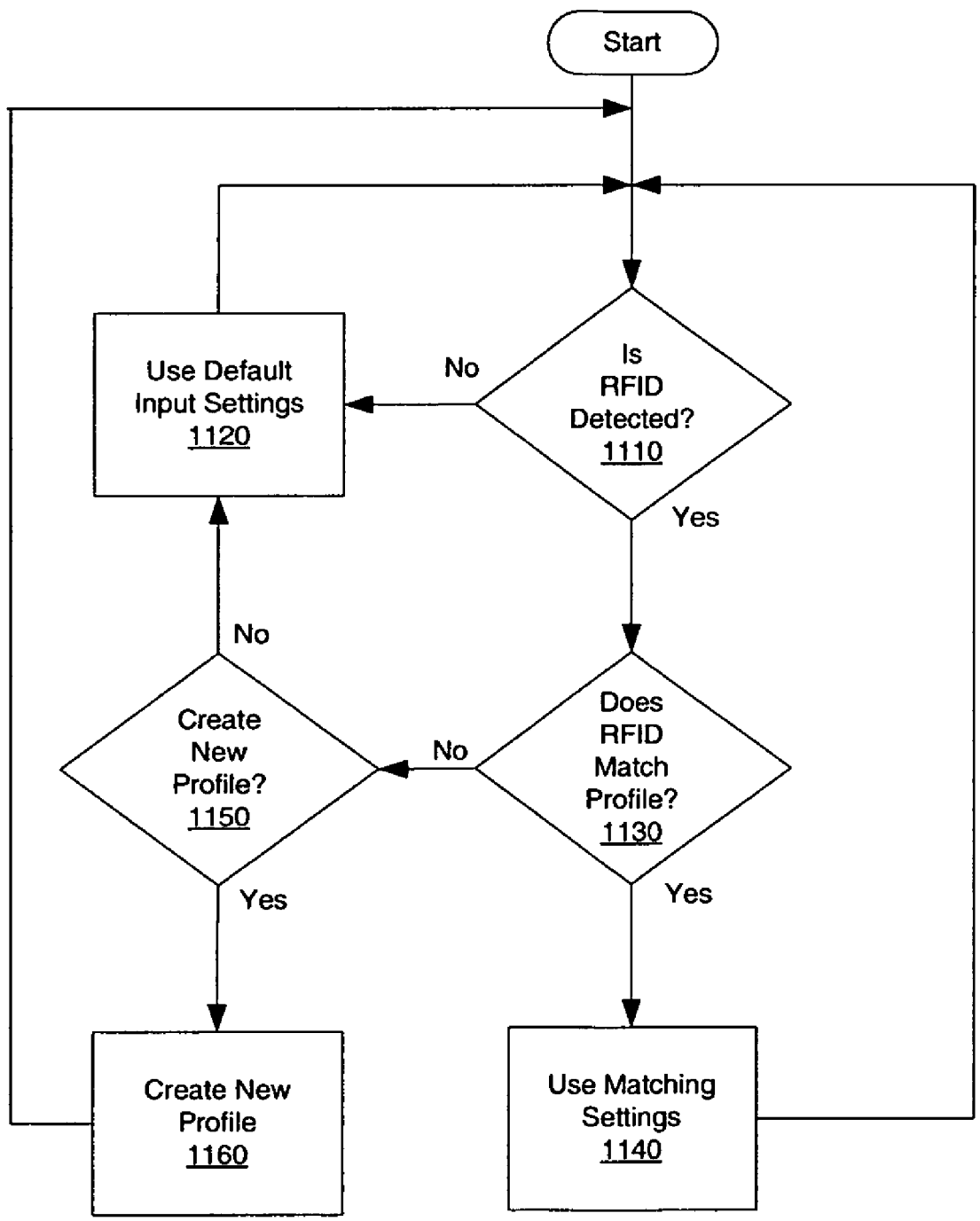
FIG. 11 is a flow chart of an illustrative method for configuring input settings of a computer peripheral device in accordance with at least one aspect of the present invention.

FIG. 11 is a flow chart of an illustrative method for configuring input settings of a computer peripheral device and/or computer in accordance with at least one aspect of the present invention. In this example, an RFID type modular tag is utilized. At step 1110, a determination is made as to whether an RFID modular tag is detected. If a modular tag is not detected, the process proceeds to step 1120 where a default configuration is used and the process returns to the start. If an RFID modular tag is detected in step 1110, a further determination is made as to whether the RFID modular tag that is detected matches a profile for the user, a computer peripheral device, an application, and/or a computer. If the RFID does match a profile, the process proceeds to step 1140 where the matching configuration is loaded. If the modular tag does not match a profile, such as in a case where the modular tag operates with a word processing application program only and the user does not have a word processing application program currently operating, the process proceeds to step 1150 where another determination is made as to whether the user wishes to create a new profile. If the user wishes to create a new profile, a new user profile is created at step 1160. Alternatively, if the user does not wish to create a new profile at step 1150, the process proceeds to step 1120 where a default configuration is used.

These modular tags can be used to recognize a particular user and initiate her account for related configurations. Further, these modular tags can provide security and convenience, e.g., user-specific speech recognition. Modular tags can be packaged with software application programs so that a user can easily configure a computer peripheral device to operate in a certain user desired manner. The modular tags may also be programmed by a user. A user can program an unprogrammed modular tag to create a configuration as desired. Alternatively, a user can reprogrammed a modular tag to change a stored configuration as desired. A user can interface with a program on a host computer that allows the user to reprogram or initially program a modular tag.

In operation, a user may have a modular tag with her, such as attached to a keychain, embedded into her clothing, or attached to a piece of her jewelry. The modular tag may be a passive RFID type modular tag or an active type RFID modular tag. Upon activation and/or entry into the operational range of a reader, the reader may receive data from the modular tag. The reader may be housed within an electronic mouse type computer input device of a computer, the computer itself, or some other device coupled to the computer, whether hardwired and/or wirelessly. The user may physically attach her modular tag to a computer related device, such as the computer itself, the electronic mouse type computer input device, and/or a display device coupled to the computer. Alternatively, the user may swipe the modular tag across the reader and/or merely come into the area of the reader signal in which readings can be performed. After the reader has read the data from the modular tag, any configuration associated with the user and/or modular tag is automatically initiated by the computer and/or computer related device. For example, the user may have a particular wall paper pattern on the display screen loaded as well as particular actuatable buttons on the computer input devices configured to any desired purpose. The display screen may have a particular setting for brightness and contrast, the electronic mouse type computer input device may have the right actuatable button perform an operation to initiate a particular application program, and the F-type actuatable buttons on the keyboard device may be configured so that the F1 actuatable button changes a fonts color, the F2 actuatable button changes the font size and the F3 actuatable button changes the font style. Should the reader sense another modular tag within its signal area, the reader may be configured to only respond to the first modular tag. Further, if the first user leaves the signal area of the reader, should a new modular tag enter the signal area of the reader, the configurations stored on the new modular tag may be implemented on the computer and/or computer related devices.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

I claim:

1. A method comprising steps of:
   providing a default mapping between actuatable inputs of a computer peripheral device and functions of a computer before establishing a communicative link between the computer peripheral device and a modular tag, the computer peripheral device being a separable device with respect to the computer, wherein the default mapping is configured to:

map each of the actuatable inputs to a corresponding default function of the computer, thereby informing the computer to perform the corresponding default function in response to actuation of each of the actuatable inputs, and map a particular function of the computer to a sequence or combination of user-invoked operations of the computer, thereby informing the computer to perform the particular function in response to the sequence or combination of user-invoked operations being invoked;

establishing the communicative link between the modular tag and the computer peripheral device;

receiving, at the computer, data from the modular tag via the computer peripheral device, wherein the received data including instructions for the computer to change the mapping between the actuatable inputs of the computer peripheral device and the functions of the computer;

configuring the computer in response to the received data to change the mapping between the actuatable inputs of the computer peripheral device and the functions of the computer while the communicative link is active such that a particular one of the actuatable inputs is mapped to the particular function of the computer instead of the corresponding default function, thereby changing the function to be performed by the computer in response to actuation of the particular one of the actuatable inputs, and allowing the particular function to be performed without invoking the sequence or combination of user-invoked operations; and in response to termination of the communicative link, reconfiguring the computer to change the mapping back to the default mapping such that the actuatable inputs are mapped, respectively, to the corresponding default functions of the computer, thereby reconfiguring the computer to perform the corresponding default function in response to actuation of the particular one of the actuatable inputs instead of the particular function, wherein the modular tag is couplable to and decouplable from the computer peripheral device, the modular tag being coupled to the computer peripheral device to establish the communicative link, the modular tag being decoupled from the computer peripheral device to terminate the communicative link, wherein an application program operating on the computer is configured to receive user input based on actuation of the particular one of the actuatable inputs, wherein the application program processes the user input to provide different outputs based on whether the modular tag is coupled to or decoupled from the computer peripheral device, respectively, and wherein the modular tag is a radio frequency identification (RFID) tag, and the computer peripheral device includes a RFID reader for establishing the communicative link with the modular tag.

2. The method of claim 1, wherein the data received from the modular tag further comprises authentication data, the method further comprising the step of authenticating the modular tag at the computer based on the received data from the modular tag.

3. The method of claim 1, wherein the modular tag is attachable to and detachable from the computer peripheral device via an access port in the computer peripheral device.

4. The method of claim 3, wherein the access port includes the RFID reader for establishing the communicative link with the modular tag.

5. The computer device of claim 1, wherein the application program is a gaming application program, the computer peripheral device being operative as a gaming controller 6. The method of claim 1, wherein:
the computer peripheral device is an electronic mouse type input device,
one of the actuatable inputs is a particular button on the electronic mouse type input device, and
wherein the configuring step changes a default function of the computer associated with the particular button to a different function.

7. The method of claim 1, wherein:
the computer peripheral device is a pen type input device,
one of the actuatable inputs comprises a mechanism for converting a freehand movement of the pen type input device across a computer screen to signals representative of said movement, and
wherein the configuring step performs one of:
changing the function associated with the freehand movement such that the appearance of digital ink that is drawn on the computer screen as a result of the freehand movement is changed, and
changing the function associated with the freehand movement from drawing electronic ink on the computer screen to erasing electronic ink from the computer screen.

8. The method of claim 1, wherein:
the computer peripheral device is a keyboard,
one of the actuatable inputs is a particular function key on the keyboard, and
wherein the configuring step changes a default function of the computer associated with the particular function key to a different function.

9. A computer device, comprising:
an interface mechanism for interfacing to a computer peripheral device, the computer peripheral device being a separable device with respect to the computer device, the computer peripheral device including actuatable inputs;
a computer-readable storage device storing a default mapping in which:
each of the actuatable inputs of the computer peripheral device is mapped to a corresponding default function of the computer device, and in which
a particular function of the computer device is mapped to a sequence or combination of user-invoked operations of the computer; and
a processor configured to:
map each of the actuatable inputs to the corresponding default function of the computer device according to the default mapping stored in the computer-readable storage device before the computer peripheral device is communicatively linked to a modular tag, thereby configuring the computer device to respond to actuation of each of the actuatable inputs by performing the respective default function;
map the particular function to the sequence or combination of user-invoked operations before the computer peripheral device is communicatively linked to the modular tag, thereby configuring the device to perform the particular function in response to the sequence or combination of user-invoked operations being invoked;
receive information from the modular tag via the interfaced computer peripheral device while the modular tag is communicatively linked to the computer peripheral device, the received information including instructions for the computer device to change the mapping between the actuatable inputs of the computer peripheral device and the functions of the computer device, change the mapping between the actuatable inputs of the computer peripheral device and the functions of the computer device such that a particular one of the actuatable inputs is mapped to the particular function of the computer device instead of the corresponding default function when the modular tag is communicatively linked to the computer peripheral device, thereby changing the function to be performed by the computer device in response to actuation of the particular one of the actuatable inputs, and allowing the particular function to be performed without invoking the sequence or combination of user-invoked operations, and when the modular tag is no longer communicatively linked to the computer peripheral device, change the mapping back to the default mapping such that the actuatable inputs are mapped, respectively, to the corresponding default functions of the computer device, thereby reconfiguring the computer to perform the corresponding default function in response to actuation of the particular one of the actuatable inputs instead of the particular function, and execute an application program which is configured to receive user input based on actuation of the particular one of the actuatable inputs, wherein the modular tag is couplable to and decouplable from the computer peripheral device, the modular tag being communicatively linked to the computer peripheral device when coupled to the computer peripheral device, the modular tag no longer being communicatively linked to the computer peripheral device when decoupled from the computer peripheral device, wherein the application program processes the user input to provide different outputs based on whether the modular tag is coupled to or decoupled from the computer peripheral device, respectively, and wherein the modular tag is a radio frequency identification (RFID) tag, and the computer peripheral device includes a RFID reader for establishing the communicative link with the modular tag.

10. The computer device of claim 9, wherein the information from the modular tag includes sensor information being sensed by the modular tag, the sensor information including at least one of: temperature information, touchpad information, pressure information, and biomedical identification information.

11. The computer related device of claim 9, wherein the computer peripheral device is an electronic mouse type input device.

12. The computer device of claim 9, wherein the modular tag is attachable to and detachable from the computer peripheral device via an access port in the computer peripheral device.

13. The computer device of claim 12, wherein
the access port of the computer peripheral device includes the RFID reader for establishing the communicative link with the modular tag, and
the computer device receives the information from the modular tag via the computer peripheral device.

14. The computer device of claim 9, wherein:
the computer peripheral device is an electronic mouse type input device,
one of the actuatable inputs is a particular button on the electronic mouse type input device, and
wherein the interface mechanism changes the function of the computer associated with the particular button from a default function to a different function.

15. The computer device of claim 9, wherein:
the computer peripheral device is a pen type input device,
one of the actuatable inputs comprises a mechanism for converting a freehand movement of the pen type input device across a computer screen to signals representative of said movement, and
wherein the interface mechanism performs one of:
changing the function associated with the freehand movement such that the appearance of digital ink that is drawn on the computer screen as a result of the freehand movement is changed, and
changing the function associated with the freehand movement from drawing electronic ink on the computer screen to erasing electronic ink from the computer screen.

16. The computer device of claim 9, wherein:
the computer peripheral device is a keyboard,
one of the actuatable inputs is a particular function key on the keyboard, and
wherein the interface mechanism changes the function of the computer associated with the particular function key from a default function to a different function.

17. A portable device for configuring a computer system, the computer system including a computer and a computer peripheral device, the computer peripheral device including actuatable inputs that are mapped to respective functions of the computer thereby instructing the computer to perform the respective function in response to actuation of each of the actuatable inputs, the computer being provided with a default mapping before a communicative link is established between the portable device and the computer peripheral device, the default mapping causing each of the actuatable inputs to be mapped to a corresponding default function and causing a particular function of the computer to be mapped to a sequence or combination of user invoked operations of the computer thereby instructing the computer to perform the particular function in response to the sequence or combination of user-invoked operations being invoked, the computer peripheral device being a separable device with respect to the computer, the portable device comprising:

a memory configured to store configuration data including instructions for the computer to change the mapping between the actuatable inputs of the computer peripheral device and the respective functions of the computer;

an interface configured to establish a communicative link with the computer peripheral device; and a sensor configured to sense data related to a user manipulation of the computer peripheral device while the communicative link is active, wherein, in response to the communicative link being established, the portable device is configured to transmit the configuration data via the communicative link to the computer in order to configure the computer to change the mapping between the actuatable inputs of the computer peripheral device and the functions of the computer such that a particular one of the actuatable inputs is mapped to the particular function of the computer instead of the corresponding default function, thereby changing the function to be performed by the computer in response to actuation of the particular one of the actuatable inputs, and allowing the particular function to be performed without invoking the sequence or combination of user-invoked operations, wherein the particular function takes into account the sensed data, wherein the mapping is automatically changed back to the default mapping such that the actuatable inputs are mapped, respectively, to the corresponding default functions of the computer after the communicative link is terminated, such that the computer is reconfigured to perform the corresponding default function in response to actuation of each of the actuatable inputs, and wherein the portable device is couplable to and decouplable from the computer peripheral device, the portable device being coupled to the computer peripheral device to establish the communicative link, the portable device being decoupled from the computer peripheral device to terminate the communicative link, wherein an application program operating on the computer is configured to receive user input based on actuation of the particular one of the actuatable inputs, wherein the application program processes the user input to provide different outputs based on whether the portable device is coupled to or decoupled from the computer peripheral device, respectively, and wherein the portable device is a radio frequency identification (RFID) tag, and the computer peripheral device includes a RFID reader for establishing the communicative link with the modular tag.

18. The portable device of claim 17, wherein the memory is programmable.

19. The portable device of claim 17, wherein the memory is only accessible when the portable device is connected to a power supply.

20. The portable device of claim 17, wherein the memory is further configured to store data associated with a plurality of configurations of a plurality of different computer peripheral devices.

21. The portable device of claim 17, wherein
the computer is configured to execute a gaming application program,
the computer peripheral device is configured as a gaming controller, and
the portable device is attached to an actuatable control of the computer peripheral device, the sensor being a pressure sensor for sensing an amount of pressure applied to the actuatable control, the sensed amount of pressure being sent to the computer as an input to the gaming application program.

* * * * *